United States Patent [19]
Ellis et al.

[11] 3,792,734
[45] Feb. 19, 1974

[54] SELF-PROPELLED TILLER

[76] Inventors: Ray G. Ellis; Glenn A. Delf, both of c/o Atlas Tool Manufacturing Co., 5147 Natural Bridge Ave., St. Louis, Mo. 63115

[22] Filed: Jan. 10, 1972

[21] Appl. No.: 216,699

[52] U.S. Cl.............. 172/43, 172/358, 172/364, 172/365, 172/366
[51] Int. Cl.............................................. A01b 33/00
[58] Field of Search.... 56/17.2; 111/82; 172/17, 42, 172/43, 329, 354, 358, 359, 364, 365–366, 675

[56] References Cited
UNITED STATES PATENTS

| | | | |
|---|---|---|---|
| 1,833,149 | 11/1931 | Barnhart | 172/364 |
| 218,558 | 8/1879 | Newsom | 172/364 |
| 3,442,335 | 5/1969 | Silbereis et al. | 172/43 |
| 1,237,752 | 8/1917 | Comi | 172/17 X |

FOREIGN PATENTS OR APPLICATIONS

| | | | |
|---|---|---|---|
| 570,755 | 7/1945 | Great Britain | 172/43 |
| 457,774 | 7/1949 | Canada | 172/43 |
| 721,798 | 1/1955 | Australia | 172/43 |
| 861,596 | 2/1961 | Great Britain | 172/42 |

*Primary Examiner*—Ernest T. Wright, Jr.
*Assistant Examiner*—Eugene H. Eickholt

[57] ABSTRACT

The tiller includes a chassis having a rearwardly mounted handle. A tines shaft is pivotally mounted forwardly of the frame and a shaft carrying a pair of ground wheels is mounted to the chassis by a pair of link plates pivotally mounted to the frame between the tines shaft and the handle. A rearwardly extending yoke including a latch pin is attached to the chassis and a notched latch bar mounted to the ground wheel shaft is engageable with the latch pin to hold the link plates in selected angular positions relative to the chassis. Adjustment of the latch bar permits control of the relative elevation between the wheels and the tines without substantial change in the handle hand-grip elevation. The latch bar is actuated by a lever pivotally connected to the handle.

1 Claim, 5 Drawing Figures

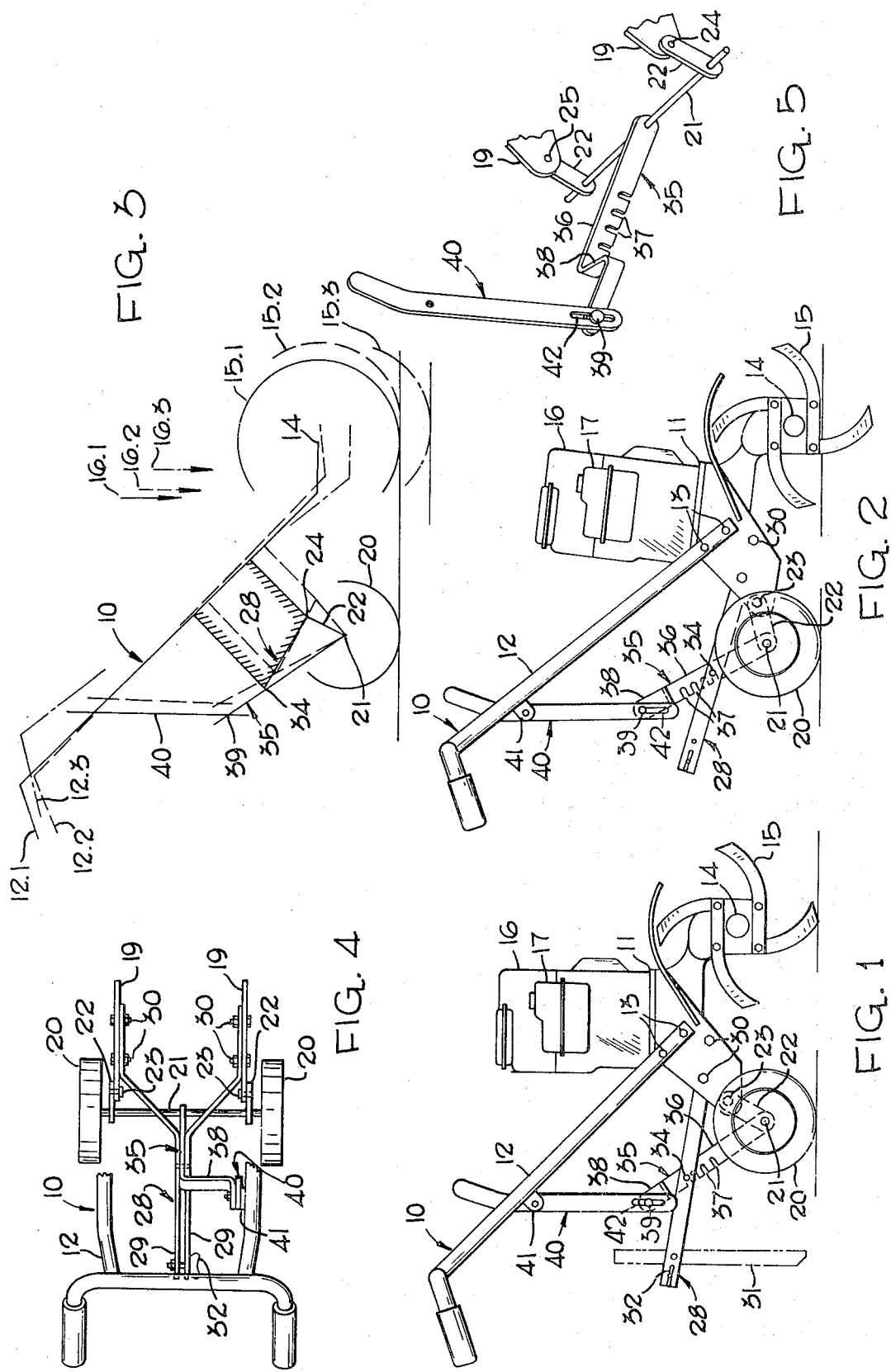

SELF-PROPELLED TILLER

BACKGROUND OF THE INVENTION

This invention relates generally to improvements in a cultivator machine, and more particularly, to a self-propelled tiller having a single pair of ground wheels and incorporating an elevation control assembly for the tines.

Mechanical cultivators and tillers of the four-wheel variety have been commercially available for many years. They have the advantage of being stable but suffer serious deficiencies when it comes to mobility. They cannot, for example, be easily turned.

Two-wheel tillers are of comparatively recent origin, and have met with commercial success to a great extent because of their compactness and superior maneuverability. In general, the chassis of two-wheel tillers is pivotable about the ground wheels to permit the forwardly disposed tines to be positioned at a suitable elevation to till the ground. One disadvantage of this operation is that as the tines are lowered to dig into the ground, the handle, which is pushed and guided by an operator, must be raised. Clearly, it is a considerable inconvenience for an operator to have to push the cultivator at an unsuitable handle level.

The problem of a variable handle level has been approached in the past in at least two different ways. In one of these, the tiller ground-wheels are mounted on a vertical, telescopic arm. Unfortunately, this solution requires that connecting bolts must be removed before the telescoping action can take place, and consequently adjustment is a slow process. Further, because of the manner of elevating the ground wheels, the distribution of the motor load remains substantially unaltered. Another approach to the problem lies in subdividing the tiller frame into two portions which are pivoted together, the forward, tines carrying portion, being rotatable relative to the rearward portion. Obviously, this solution involves a severe departure from the simple, relatively inexpensive unitary frame or chassis desirable for garden machinery. This latter type of machine also lacks any advantage which might be gained by redistribution of motor weight to the tines during the tilling operation.

SUMMARY OF THE INVENTION:

The present tiller, because it is of the two-wheeled variety, may be easily turned and is highly maneuverable. The handle may be kept at substantially the same level to suit the convenience of the operator during the cutting operation, at different cutting depths, because of an elevation control assembly which permits rapid elevation adjustment of the tines by means of a remotely controlled pivot and latch mechanism.

The frame of chassis is essentially unitary in form, and there are no major articulated parts. The elevation control of the ground wheels, relative to the tines, is such that the weight of the motor is efficiently distributed to assist the cutting action.

The cultivator includes a frame having a handle, and a first shaft is rotatively mounted to the frame, the shaft including a plurality of tines. Depending link plates are pivotally connected to each side of the frame, and a ground wheel shaft is carried by the remote end of the link plates in spaced radial relation from the pivotal connection.

An elevational control assembly is provided between the frame and the ground wheel shaft to hold the link plates in selected angular positions relative to the frame and thereby control the relative elevation between the ground wheels and the tines.

Motor means is mounted on the frame, the motor means being disposed in fixed spaced relation to the tines shaft and variable spaced relation to the ground wheel shaft, said variable spacing being conditioned by the angular disposition of the link plates. As the elevation of the tines falls below the elevation of the ground wheels, the motor load on the tines shaft increases.

The elevational control assembly includes a notched latch bar extending operatively between the frame and the link plates. The latch bar is effectively pivotally connected to the link plates, by being rotatively mounted to the ground wheel shaft and is selectively connected to the frame by engagement of one of the notches with a latch pin on the frame. The frame includes an arm extending rearwardly of the ground wheels, the arm being provided with the latch pin.

A latch actuating means provides a means of operating the latch bar and the latch actuating means includes an actuating lever pivotally connected to the handle to provide remote control of the latching action.

BRIEF DESCRIPTION OF THE DRAWING:

FIG. 1 is an elevational view illustrating the tiller in a non-cutting position, the wheels and the tines engaging the ground at substantially the same elevation;

FIG. 2 is an elevational view illustrating the tiller in an operative position, the tines cutting below the surface of the ground;

FIG. 3 is a diagrammatic representation of the tiller illustrating the transition between the non-cutting and cutting positions;

FIG. 4 is a fragmentary plan view as taken on line 4—4 of FIG. 1, and

FIG. 5 is a fragmentary perspective view showing in part the linkage and latching mechanism.

DESCRIPTION OF THE PREFERRED EMBODIMENT:

Referring now by characters of reference to the drawing, and first to FIG. 1, it will be understood that the tiller, generally indicated by numeral 10, includes a chassis or frame 11 having a handle 12 rigidly attached thereto on each side by bolts 13.

A shaft 14, constituting a first shaft means, is rotatively mounted to the forward part of the frame 11, said shaft 14 carrying a plurality of tines 15 which constitute a cutting means for performing the tilling operation. A motor 16 including a gas tank 17 is mounted on the top part of the frame 11. The center of gravity of the motor 16 is substantially fixed relative to the frame 11.

The tiller 10 also includes a pair of ground wheels 20 mounted on a shaft 21 constituting a second shaft means. The shaft 21 is operatively mounted to the frame 11 through the medium of a pair of link plates 22, which constitute link means, each of the link plates 22 receiving one end of the shaft 21. The frame 11 includes a pair of sapced side plates 19 to which the link plates 22 are pivotally connected by means of bolts 23 received in corresponding apertures 24 and 25 in the link plates 22 and side plates 19 respectively. The bolts 23 constitute pivot means connecting the links 22 to said frame 11. Because of this arrangement, the shaft 21 is effectively mounted to the said link plates 22 in spaced radial relation from the pivot means. Thus, said shaft 21 and the ground wheels 20 mounted thereon may be orbited about the pivot bolts 23.

As shown in FIGS. 1 and 4, the frame 11 includes a Y-shaped yoke 28 provided by a pair of spaced elongate plates 29 rigidly attached to the frame 11 by bolts 30 and constituting an arm means. The yoke 28 provides a connector for a rearwardly disposed drag bar generally indicated by numeral 31 which is pivotally attached to the remote end of the yoke by a thumbscrew 32. The thumbscrew 32 may be tightened to control the disposition of the drag bar 31. In addition to providing a mounting for the drag bar 26, the yoke provides a transverse latch pin 34 extending between plates 29.

As shown particularly in FIGS. 4 and 5, a latch bar 35 is pivotally mounted to the shaft 21 midway between the link plates 22. The latch bar 35 includes a latch portion 36, providing a plurality of notches 37 selectively engageable with the latch pin 34, and a cranked portion 38. The latch bar 35 constitutes an adjustment means operatively extending between the frame 11 and the link plates 22 and it is received between the spaced plates 39 to permit engagement of said latch bar notches with said pin 34. In this way the link plates 22 may be held in selective angular positions relative to the pivot bolts 23 whereby to control th relative elevation between the ground wheels 20 and the tines shaft 14 which is mounted to the frame 11.

Before a change in elevation can be accomplished the latch bar 35 must be unlatched from the latch pin 34. The unlatching action is performed by rotating the notched latch bar 35 about the ground wheel shaft 21 and the latch bar is rotated by applying a force to the cranked portion 38 which constitutes part of an actuating means. The cranked portion 38 includes an outstanding pin 39 constituting a first engagement means and in the preferred embodiment of the invention force is applied to the pin 39 by means of an actuating lever 40. The actuating lever 40 is pivotally mounted at its upper end to the tiller handle 12 by means of a lug 41 attached to said tiller handle. At its lower end the lever 40 includes a slot 42, constituting a second engagement means which receives the pin 39 in sliding relation. Thus, when the operator rotates the lever 40 in counterclocIwise direction the latch bar 35 is rotated in a clockwise direction and thereby unlatched. It will be understood that during this unlatching operation the tiller handle 12 can be raised slightly so that the load on the ground wheels is relieved and transferred to the tines temporarily. By pivoting the frame 11 counterclockwise about the tines shaft 11 the latch bar 35 can be moved to a different position and relatched by engaging a different notch 37 with the pin 34 so that the structural disposition of the ground wheels 20 and the tines 15 is changed. The result of this change is that the spacing of the tines shaft 14 and the ground wheel shaft 21 is increased and the handle 12 is lowered. By pivoting the frame 11 about the ground wheels shaft 21 the handle 12 is raised to its original position and the tines are lowered into an operative cutting position.

It is thought that the functional advantages of this tiller have become fully apparent from the foregoing description of parts. However, for completeness of disclosure, the transition from a non-operational to an operational position will be briefly described with particular reference to FIG. 3.

FIG. 3 illustrates the tiller 10 in three positions. Suffix numerals 1, 2 and 3 are used to indicate the disposition of parts in these three positions where appropriate. The first position, in full lines, corresponds to that shown in FIG. 1. It will be understood that the shaded portion represents a hypothetical frame, simplified to indicate the node points representing the pivot bolts 23 and the latch pin 34. The second position, in broken lines, illustrates the disposition of parts following unlatching and relatching but preparatory to cutting. The third position, in phantom lines, corresponds to that shown in FIG. 2 and is shown in part only, for clarity.

In the first position the tines 15 (15.1) and the ground-engaging wheels 20 are both at ground level. It will be assumed that the handle 12 (12.1) is at a convenient height for the operator and that the initial notch of the latch bar 35 engages the pin 34. In this position, the weight of the motor 16 (16.1) is distributed between the tines shaft 14 and the wheel shaft 21 in proportion to the perpendicular distances between each of the shafts and the line of action of the center of gravity of the motor 16. It will be observed that the pivot belts 23, shaft 21 and the pin 34 are the node points of a triangular force frame. The latch bar 35 forms a variable arm of the triangular force frame and tiller weight, distributed to bolt 23 and pin 34, provides pressure contact holding the notch in engagement with the pin 34.

The tiller 10 is moved to the second position in the following manner. By exerting upward pressure on the handle 12 to relieve pressure on the ground wheels 20 and transfer it to the tines 15, the operator can adjust the latch bar 35 simply by pulling rearwardly on the upper portion of the lever 40. The result of this action is that the side of the slot 42 is moved and pushes against the pin 39 of the cranked portion of the latch bar 35 thereby unlatching said latch bar. By lowerin the handle 12 the link plates 22 are orbited in a clockwise direction about the ground wheel shaft 21. Because of this the frame 11, including the yoke 28, is lowered so that another notch of the latch bar 35 can be engaged with the latch pin 34. When such latching is achieved the weight of the tiller 10 can once again be taken by the ground wheels and the tiller is in the second position, the handle position being as indicated by 12.2. As a result of this action a new force triangle is formed that increases the perpendicular distance of the ground wheel shaft 21 from the center of gravity of the motor, indicated by 16.2, tending to increase the weight distribution of said motor to the tines shaft 14. When the tiller tines 15 are motorized the handle 12 can be raised and returned substantially to its original elevation indicated by 12.3 with the result the frame 11 is pivoted about the ground wheels 20 and the tines 15 lowered to the third, cutting position indicated by numeral 15.3.

FIGS. 2 and 3 clearly indicate this cutting position. It will be observed that as the handle 12 is raised to pivot the frame 11 about the ground-engaging wheels 20 and lower the tines 15, the weight of the motor 16 distributed to the tines 15 is increased, because of the forward rotation of the motor to a point indicated by numeral 16.3. The shifting of the weight forward assists the tines 15 to cut into the ground.

The operator may now proceed on his way and till the ground with the handle 12 at a convenient level. The link plates 22 are locked in position by pressure engagement of the latch bar 35 with the latch pin 34, and the operator may make fine changes in tilling depth at will, as he goes, simply by applying light pressure to the tiller handle 12. Such changes will not vary the elevation of the handle 12 substantially.

We claim as our invention:

1. In a two wheel tiller:
   a. frame means including a handle,
   b. a first shaft mounted forwardly of the frame means, and including a plurality of tines,
   c. a second shaft spaced rearwardly of the first shaft,
   d. a pair of ground wheels mounted in side-by-side relation on the second shaft,
   e. link means including pivot means pivotally mounting the link means to the frame means rearwardly of the first shaft, the link means carrying the second shaft in spaced orbital relation about the pivot means,
   f. elevation adjustment means including:
      1. a latch member of adjustable effective length extending between the frame means and the link means holding the link means in selective angular disposition about the pivot means, and
      2. actuating means including an actuating lever operatively engageable with the latch member to unlatch and relatch the latch member to change the angular disposition of the link means whereby to orbit said second shaft about the pivot means and change the spacing between said shafts,
   g. the frame means including an arm member extending rearwardly of the second shaft,
   h. the latch member being pivotally connected to the link means and latchingly connectible to the arm member, one of said members including a latch pin and the other of said members including a plurality of notches selectively engaging the latch pin,
   i. the latch member including engagement means, and
   j. the actuating lever having a cooperating engagement means, one of said engagement means including an engagement pin and the other of said engagement means including a slot slidingly receiving the engagement pin to move the latch member out of the latched position when the actuating lever is rotated in one direction.

* * * * *